July 29, 1930.  J. B. ICRE  1,771,790
VEHICLE FENDER AND BRAKE
Filed Jan. 22, 1929
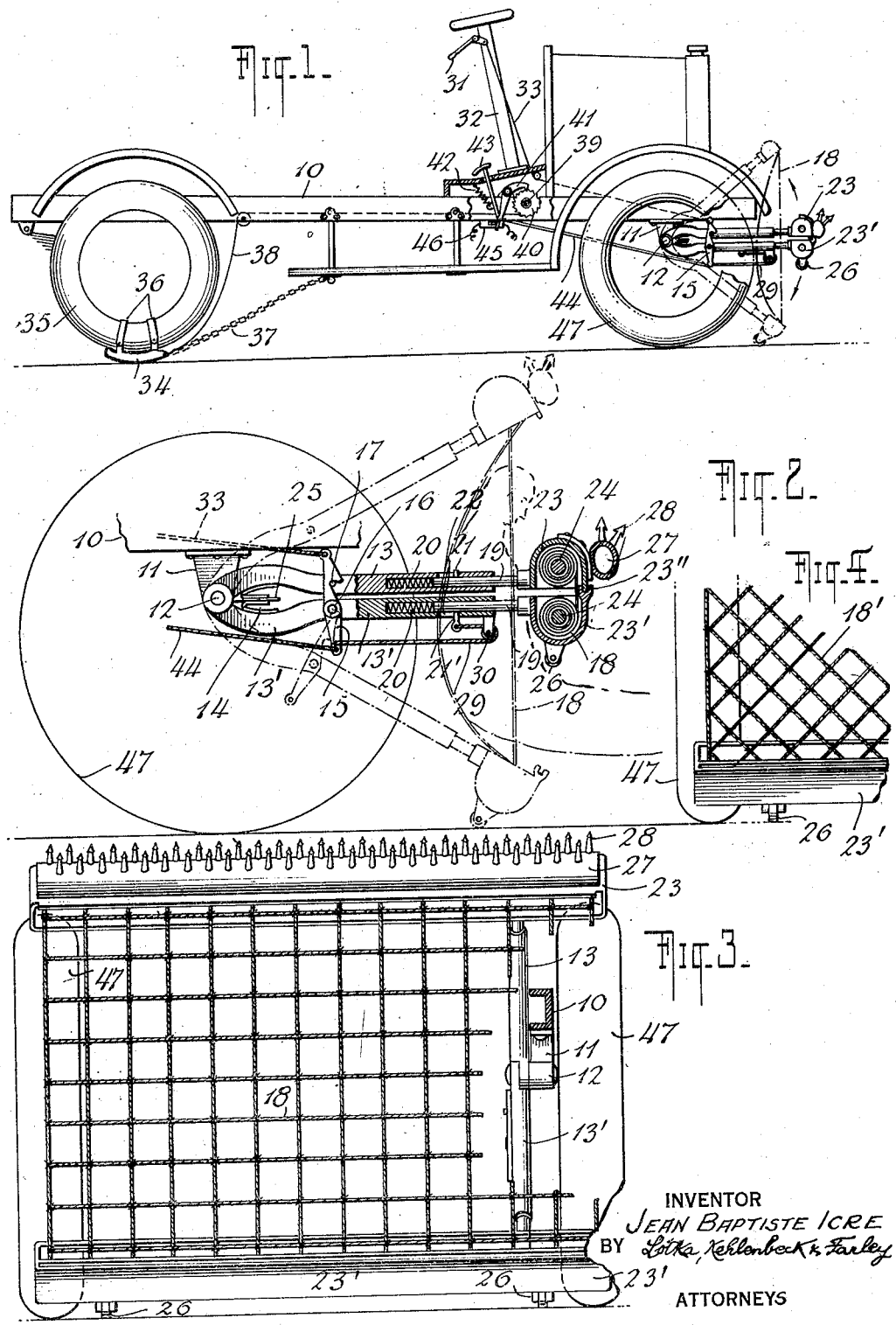
INVENTOR
JEAN BAPTISTE ICRE
BY *Litka, Kehlenbeck & Farley*
ATTORNEYS Patented July 29, 1930

1,771,790

UNITED STATES PATENT OFFICE

JEAN BAPTISTE ICRE, OF NEW YORK, N. Y.

VEHICLE FENDER AND BRAKE

Application filed January 22, 1929. Serial No. 334,191.

My invention relates to fenders applied as a protective guard on motor cars, street cars, and other vehicles, and has for its object to provide an improved device of this character, adapted for automatic operation in the event of contact with a person or obstruction in the path of the vehicle. Other features of the invention relate to means enabling the chauffeur, motorman, or other person controlling the vehicle, to throw the fender into its active position even before it strikes a person or obstruction. Still other features of the invention relate to arrangements whereby a brake is associated with the fender, and to a switch whereby (in the case of a vehicle propelled by an internal combustion engine) the motor will be stopped by cutting off the ignition, whenever the fender or the brake is operated.

Without desiring to restrict myself to the specific details illustrated, I will now describe a typical, satisfactory embodiment of my invention, as represented in the accompanying drawings, in which Fig. 1 is a somewhat diagrammatic side elevation, with parts in section, of a motor car provided with my improved fender, brake, and switch; Fig. 2 is an enlarged side elevation of the fender mechanism proper, with parts in section; Fig. 3 is a partial front elevation of the fender, in the open or active position; and Fig. 4 is a partial front view of a modifcation.

On the frame or chassis 10 of the car I have indicated carriers or brackets 11 in which are journaled, about transverse horizontal axes 12, arms 13, 13', one pair at each side of the vehicle, adapted to swing to the inactive, closed position, in which they are approximately horizontal, or to the active, open position in which they diverge forwardly. A spring device 14 tends to throw the arms 13, 13' into the open position, but they are normally held in the closed position, as by means of a latch 15 pivoted at 16 to the lower arm 13' and hooking over a pin 17 on the corresponding upper arm 13.

Each of the arms 13, 13' has a telescopic or sliding connection with a forward section carrying the fender proper or guard 18. As illustrated, the arms 13, 13' have longitudinal sockets to receive the rear ends of sliding rods 19, urged forward by coiled springs 20. The movement of the rods 19 is limited by the engagement of pins 21, 21' on said rods with the ends of longitudinal slots 22 in the arms 13, 13'. At its forward end, each of the rods 19 is connected rigidly with a cross member 23, or 23', which affords a connection between those sections of the fender mechanism which lie on opposite sides of the vehicle. While I may provide a latch such as 15 on each side of the vehicle, it will be sufficient and preferred to use a latch on only one side of the vehicle.

The cross members 23, 23' are shown as forming housings, U-shaped in cross section, with their open sides (bottom and top respectively) facing each other. Within these housings are located transverse shafts 24, of the well-known spring-actuated type customary in shade-roller construction (the details have not been shown), to which are secured the ends of the fender guard 18, illustrated as a net work of cords, or like flexible material which may be wound readily on the shafts 24 (by the action of the springs thereon) when the fender is closed, and which will unwind therefrom as the fender opens, it being understood that the springs 14 will be made of greater strength than those which tend to coil the guard 18 on the shafts 24.

Suitable means are provided for supporting the fender in the closed position. For instance, as illustrated, each spring device 14 may consist of two springs engaging the upper arm 13 and the lower arm 13' respectively, said springs being secured by riveting or otherwise, to a stationary support 25 connected with the chassis 10.

Preferably the cross members 23, 23' are constructed with interlocking formations, such as the tongue and groove formation indicated at 23", compelling them to move lengthwise in unison when the fender is in the closed position. The lower cross member 23' is preferably provided with one or more projections or rollers 26 adapted to engage the ground when the fender is thrown open. The upper cross member 23 preferably carries a cushion 27 of rubber or other suitable material, to ease the blow in the case of striking a person, and such cushion may be provided with soft rubber projections or hooks 28 adapted to catch in a person's clothing, or to be grasped by such person, so as to prevent such person from being thrown, by the force of the impact, away from the motor car and possibly into the path of another car.

It will be evident that when a person or obstruction is struck either by the upper cross member 23 or the lower member 23', then (owing to the interlocking formation 23") both the upper and the lower member of the forward fender section will move rearwardly. As the lower member moves rearwardly, the pin 21' will exert a pull on the wire or other flexible connection 29 which passes in engagement with a guide pulley 30 carried by the lower arm 13', and as this wire is attached to the latch 15, the latter will be swung on its pivot 16 in such a way as to clear the pin 17 and release the fender. The arm 13 will then fly upward under the influence of the spring device 14 while the arm 13' will drop into contact with the ground. The lower spring 14 might be omitted, and gravity alone relied upon to bring the arm 13' to its lower position. As the arms 13, 13' open to the active position shown by dotted lines in Figs. 1 and 2, the guard or net 18 will unwind from the shafts 24 and assume its active, stretched position, substantially in a vertical plane. This guard also constitutes means to limit the extent to which the members 13, 13' will move apart. The springs 20 act as an additional cushioning device to temper the force of the impact of the fender with a person or obstruction. It will be noted that in order to reset the fender to its inactive position, the chauffeur will be compelled to alight from the car, thus preventing so-called "hit-and-run" action on the part of the driver after an accident.

Inasmuch as it may be desirable to enable the chauffeur to drop the fender into the active position before the person or obstacle is actually struck, means under the chauffeur's control may be provided for swinging the latch 15 away from the pin 17. Such means may consist, for instance, of a lever 31 mounted on the steering post 32 and connected by a wire 33 or its equivalent, with the upper portion of said latch. Pressing down on the lever 31 will pull the hook end of the latch 15 backward, and thus release the arms 13, 13' with the same effect as if the latch had been operated by the rearward movement of the forward fender section relatively to said arms 13, 13'.

Furthermore, I consider it desirable that a brake should be applied simultaneously with the throwing of the fender into its active position. This brake is preferably a special emergency brake, additional to the usual brake or brakes of the car. Thus, Fig. 1 indicates in diagrammatic fashion, a brake of the type disclosed in Letters Patent of the United States Nos. 1,562,702 and 1,642,879 issued to me on November 24, 1925 and September 20, 1927 respectively. Said brake mechanism comprises brake shoes 34 adapted to become interposed between the rear wheels 35 and the ground, as in Fig. 1, a carrier 36 connected with each of said shoes and adapted to travel circumferentially on the rim of the respective wheel, a chain 37 to limit such circumferential movement of the brake shoe 34 and its carrier 36, a wire 38 or the like extending from each brake shoe to a transverse shaft 39, on which the wires from the two brake shoes are adapted to wind, a ratchet wheel 40 on said shaft, and a pivoted pawl 41 normally holding said ratchet and shaft against turning, it being understood that in the original or set (inactive) position of this mechanism the brake shoes 34 are raised, as explained more particularly in my aforesaid Letters Patent No. 1,562,702. The pawl 41 is normally held in engagement by a spring 42, and a pedal 43 enables the driver to lift the pawl off the ratchet, whereupon the brake shoes 34 will drop by gravity to the applied position illustrated. In my present invention, this brake mechanism is connected operatively with the fender mechanism by means of a wire 44 or the like, the rear end of which is secured to the pawl 41, below the pivot of said pawl, while the forward end of the wire 44 is secured to the lower portion of the latch 15. Thus whenever said latch is swung to the releasing position (whether by the automatic action described or by the driver's operation of the lever 31), the pawl 41 will be lifted, and the brakes applied. Thus, with the particular arrangement illustrated, it is impossible for the fender to be thrown to the active position, without causing a simultaneous application of the brakes; on the other hand, the pedal 43 provides a means for applying the brakes without throwing the fender into its active position.

Finally, it may be desirable to provide means for stopping the engine of the car whenever the brake referred to above is applied, or the fender thrown into its active position. I prefer to accomplish this by cutting off the ignition, when the car is propelled by an internal combustion engine. Thus Fig. 1 indicates at 45 a tumble switch adapted to be operated by the lower arm of the pawl 41 and controlling a gap in the circuit 46 in such a manner that forward movement of the said pawl arm will throw the switch into the circuit-breaking position, in which such switch will remain until reset by hand to the circuit-closing position. The circuit 46 would be the ignition circuit of the engine, when the latter is an internal combustion engine; or, when the car is driven by an electric motor, the circuit 46 would be one of the motor circuits. It will be understood that the fender will be arranged in such a manner that in the open or active position (dotted lines in Figs. 1 and 2) the net or guard 18 will be far enough in advance of the front wheels 47 to prevent such guard or net from coming in contact with the front wheels even when the forward section of the fender is forced back, against the action of the springs 20, by collision with a person or heavy object. In case of collision with relatively light objects, the springs 20 will indeed be compressed by the impact, but will rebound quickly, and this action will tend to hurl such light objects away from the fender.

While in Fig. 3 the fender or guard 18 is shown as composed of horizontal and vertical cables or like flexible members, preferably secured at their intersections, I may adopt the modification shown in Fig. 4, where the flexible members of the guard 18' are inclined. With this arrangement, there is less danger of a person sticking a hand through the meshes of the guard.

It will be understood that when the arms 13, 13' have been opened to the active position the shade roller type of spring actuation employed for the shafts 24 will normally hold the flexible fender 18 in the taut, stretched condition in the vertical plane as shown in dotted lines in Figs. 1 and 2, and in addition will permit, together with the flexible properties of the fender proper, said fender to yield and assume the rearwardly curved form, also shown in dotted lines in Fig. 2, thereby not only conforming to the shape of a person's body or an obstacle picked up by the fender, but also acting to hold such body or obstacle within the fender and preventing it from rolling out on the ground.

Various modifications may be made without departing from the nature of my invention as defined in the appended claims.

I claim:

1. A vehicle fender comprising a rear section composed of upper and lower members movable up and down toward and from each other, and a forward section composed of upper and lower side portions mounted to slide longitudinally of the respective members of the said rear section, cross members connecting the upper side portions and the lower side portions respectively, an extensible and collapsible guard extending from the upper cross member to the lower cross member, a latching device for normally locking the upper and lower members of the rear section against relative motion, means tending to move said upper and lower members apart, means tending to throw the forward fender section forwardly relatively to the rear section, and on operative connection between the said forward section and said latching device to throw the latter into the inactive or releasing position by the rearward movement of the forward fender section relatively to the rear section.

2. A vehicle fender comprising a rear section composed of upper and lower members separable from each other, and a forward section composed of upper and lower side portions mounted to slide longitudinally of the respective members of said rear section, cross members connecting the upper side portions and the lower side portions respectively, an extensible and collapsible guard connecting the upper cross member with the lower cross member, a latching device for normally locking the upper and the lower members of the rear section against relative motion, means tending to throw the forward fender section forwardly relatively to the rear section, and an operative connection between said forward section and said latching device to cause the rearward movement of said forward section relatively to the rear section to bring the latching device into a position in which it unlocks the upper and the lower members from each other and allows their separation.

3. A vehicle fender comprising upper and lower sections movable up and down toward and from each other and provided with cross members at their forward ends, said cross members having open sockets facing each other, a collapsible and extensible guard connecting said cross members and adapted to be coiled within said sockets when said cross members are adjacent to each other, a device for normally latching said fender sections against relative movement, means tending to move said sections away from each other, and means for releasing the latching device.

4. A vehicle fender comprising upper and lower sections separable from each other and provided with cross members at their forward ends, said cross members having open sockets facing each other, a collapsible and extensible guard connecting said cross members and adapted to be coiled within said sockets when said cross members are adjacent to each other, a device for normally latching said fender sections against relative movement, means tending to separate said sections, and means for releasing the latching device.

5. A vehicle fender according to claim 2, in which the cross members are provided with interlocking formations which compel such members to move forward and rearward in unison while permitting the separation of said members in a vertical direction.

6. A vehicle fender according to claim 2, in which one of the cross members is provided with a groove extending lengthwise of such member on the side facing the other cross member, while the latter is provided with a tongue adapted to enter said groove.

7. A vehicle fender according to claim 2, in which the upper cross member is provided with a cushion extending lengthwise thereof.

8. A vehicle fender according to claim 2, in which the upper cross member is provided with a cushion having holding projections of soft material.

In testimony whereof I have hereunto set my hand.

JEAN BAPTISTE ICRE.